April 29, 1924.

M. McG. STOKES 1,492,487

ATTACHMENT FOR TRACTORS AND OTHER POWER DRIVEN MACHINERY

Filed July 2, 1923

INVENTOR
Miles McGehee Stokes.
BY James J. Sheehy
ATTORNEYS

Patented Apr. 29, 1924.

1,492,487

UNITED STATES PATENT OFFICE.

MILES McGEHEE STOKES, OF SELMA, MISSISSIPPI.

ATTACHMENT FOR TRACTORS AND OTHER POWER-DRIVEN MACHINERY.

Application filed July 2, 1923. Serial No. 649,141.

*To all whom it may concern:*

Be it known that I, MILES MCGEHEE STOKES, a citizen of the United States, residing at Selma, in the county of Adams and State of Mississippi, have invented new and useful Improvements in Attachments for Tractors and Other Power-Driven Machinery, of which the following is a specification.

My present invention pertains to attachments for tractors and other power driven machinery, and it contemplates the provision of means through the medium of which the vehicle to which the attachment is secured will be prevented from tilting over backward and thereby causing untold damage to the vehicle.

The invention further contemplates the provision of an attachment for tractors and other vehicles through the medium of which the wheels of the vehicle will be prevented from digging into the ground and thereby impede forward movement of the vehicle.

The invention in all of its details will be fully understood from the following description and claim when the same are read in connection with the drawings accompanying and forming part of this application, in which:—

Figure 1:
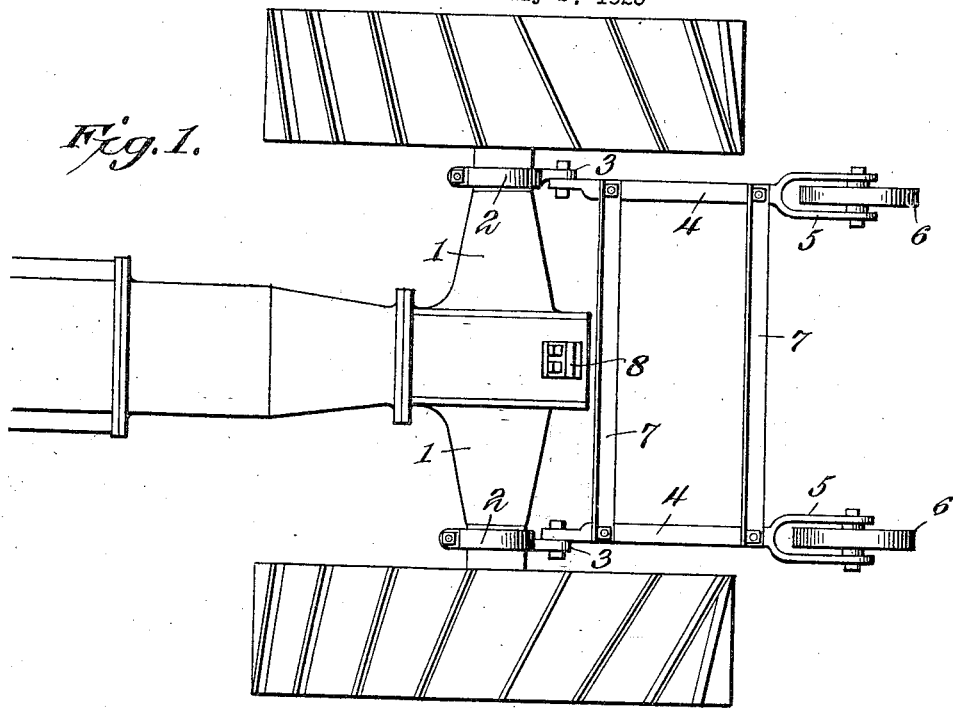
Figure 2:
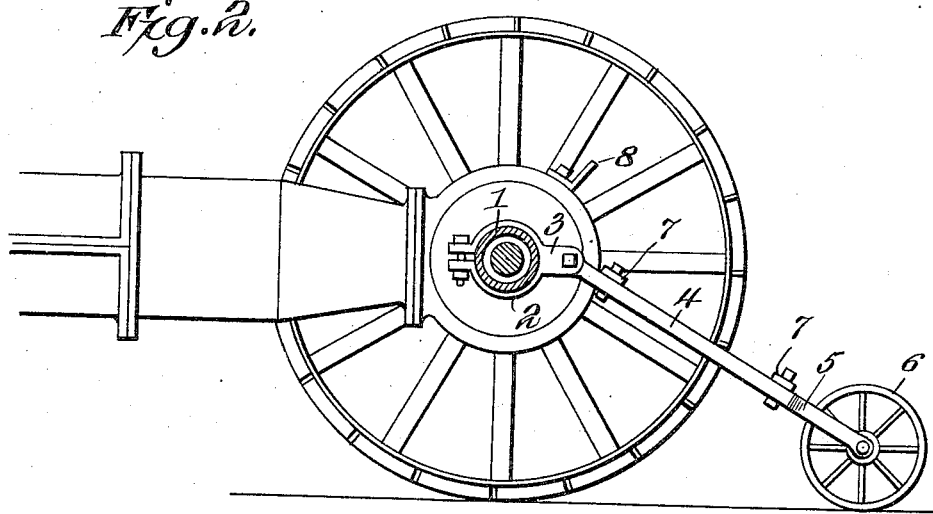

Figure 1 is a top plan view of a tractor equipped with my novel improvements, and Figure 2 is a view partly in section and partly in side elevation of a tractor and showing the attachment secured thereto.

Similar numerals of reference designate corresponding parts in all the views of the drawings.

My novel device is shown as secured to a tractor but I would have it understood that it may be secured to any form of power driven vehicle and numeral 1 designates the housing surrounding the axle on which the tread wheels are mounted and secured about the axle adjacent each wheel casing are collars 2 adjustable at one end. These collars are provided with outwardly extending portions 3 having an aperture to receive a lug formed on the inner end of the bars 4 of my novel attachment.

At their rear ends the bars 4 are provided with hangers 5 that receive the small wheels 6 and extending from one to the other of the bars 4 are rods 7.

Permanently bolted to the transmission casing or at any other suitable point is a projection 8 and this projection will bring up against the forward bar 7 of the frame should the wheel attempt to dig in or the front wheels of the vehicle leave the ground.

In the operation of the attachment any tendency of the vehicle to tilt over backwards will be arrested by contact of the lug 8 with the bar or brace 7 at the forward end of the frame or attachment.

Manifestly I do not wish to be confined to any particular material or configuration in constructing my device and it will be readily seen that the attachment is ready to be secured to or removed from a vehicle with but a slight amount of effort.

The housing 1 and bar 4 may if desired be formed in a single piece with the balance of the housing bolted above or beneath the axle and in addition to the projection I reserve the right to so construct bar 7 that it will pass over the outer casing of the differential beneath the seat and strike the top of the differential housing and hence give a stronger resistance than if it struck projection 8. However, if the bar 7 strikes projection 8 or otherwise there will be sufficient play to permit tractor to tilt upwards as far as it is safe in order to permit travel over ditches and the like.

Having described my invention, what I claim and desire to secure by Letters-Patent is:—

In an attachment for tractors, the combination of a vehicle, a projection formed at a point adjacent the center of the axle thereof, a frame pivotally secured to the axle by means of collars that are secured to the axle; said frame comprising two cross-bars that are secured to each other by means of inclined bars that are secured to the ends of the cross-bars, forked portions secured at each end of the lower of the cross-bars and wheels mounted in the forked portions; the upper cross-bars being adapted at times to engage the projection on the vehicle.

In testimony whereof I have hereunto set my hand in presence of two subscribing witnesses.

MILES McGEHEE STOKES.

Witnesses:
ELIZABETH O. REED,
CHARLES F. PATTERSON.